(12) United States Patent
Kosterev

(10) Patent No.: US 12,216,046 B2
(45) Date of Patent: Feb. 4, 2025

(54) MEASUREMENT OF DISSOLVED OXYGEN USING OPTICAL RADIATION INDUCED LUMINESCENCE

(71) Applicant: Yokogawa Electric Corporation, Tokyo (JP)

(72) Inventor: Anatoliy A. Kosterev, Sugar Land, TX (US)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 7 days.

(21) Appl. No.: 18/222,893

(22) Filed: Jul. 17, 2023

(65) Prior Publication Data
US 2024/0192130 A1    Jun. 13, 2024

Related U.S. Application Data

(63) Continuation of application No. 17/158,717, filed on Jan. 26, 2021, now Pat. No. 11,874,221.

(51) Int. Cl.
  *G01N 21/31*  (2006.01)
  *G01K 11/00*  (2006.01)
  *G01N 21/64*  (2006.01)

(52) U.S. Cl.
  CPC ......... *G01N 21/3103* (2013.01); *G01K 11/00* (2013.01); *G01N 21/645* (2013.01);
  (Continued)

(58) Field of Classification Search
  CPC ............. G01N 21/3103; G01N 21/645; G01N 2021/6471; G01N 2201/068;
  (Continued)

(56) References Cited

U.S. PATENT DOCUMENTS

| 4,576,173 A | 3/1986 | Parker et al. |
| 4,892,383 A | 1/1990 | Klainer et al. |

(Continued)

FOREIGN PATENT DOCUMENTS

| AT | 409306 | 7/2002 |
| CN | 107153055 | 9/2017 |

(Continued)

OTHER PUBLICATIONS

Japan Patent Office: Second Office Action issued for Application No. 2022-009391, 2 pages, dated Dec. 12, 2023.

(Continued)

*Primary Examiner* — Mohamed K Amara
(74) *Attorney, Agent, or Firm* — Gray Ice Higdon

(57) ABSTRACT

Methods and apparatus for analyzing optical measurements to determine whether a liquid includes dissolved oxygen, to determine a predicted concentration of the dissolved oxygen in the liquid, and/or to determine additional or alternative feature(s) related to dissolved oxygen in the liquid. An optical source can be controlled to emit optical radiation into a container that contains the liquid. The optical source can be located outside of the container, and the optical radiation includes (e.g., is restricted to) radiation that conforms to a dissolved oxygen absorption band. The optical radiation can be pulsed or can be periodically intensity modulated. A photodetector, located outside of the container but in optical communication with the interior of the container, can generate the optical measurements used in the analysis.

20 Claims, 4 Drawing Sheets

(52) U.S. Cl.
CPC ............... *G01N 2021/6471* (2013.01); *G01N 2201/068* (2013.01)

(58) Field of Classification Search
CPC .... G01N 21/6408; G01N 21/63; G01K 11/00; G01K 11/20
See application file for complete search history.

(56) References Cited

U.S. PATENT DOCUMENTS

| | | |
|---|---|---|
| 5,272,090 A | 12/1993 | Gavish et al. |
| 5,281,825 A | 1/1994 | Berndt et al. |
| 5,460,971 A | 10/1995 | Gottlieb |
| 5,718,842 A | 2/1998 | Papkovsky et al. |
| 5,919,710 A | 7/1999 | Gord et al. |
| 6,037,181 A | 3/2000 | Buchwald et al. |
| 6,117,335 A | 9/2000 | Bender |
| 6,207,461 B1 | 3/2001 | Baumann et al. |
| 6,280,171 B1 | 8/2001 | Buazza |
| 6,362,175 B1 | 3/2002 | Vinogradov et al. |
| 6,664,111 B2 | 12/2003 | Bentsen et al. |
| 7,208,071 B2 | 4/2007 | Feng |
| 8,173,438 B1 | 5/2012 | Putnam et al. |
| 8,834,692 B2 | 9/2014 | Yu et al. |
| 9,541,539 B2 | 1/2017 | Machuca et al. |
| 9,897,570 B2 | 2/2018 | Inoue et al. |
| 10,247,701 B2 | 4/2019 | Aetukuri et al. |
| 10,379,047 B2 | 8/2019 | Tolosa et al. |
| 10,499,839 B1 | 12/2019 | Acosta et al. |
| 11,142,473 B2 | 10/2021 | Van Mooy et al. |
| 11,467,151 B1 | 10/2022 | Souid |
| 2001/0031224 A1 | 10/2001 | Labuda et al. |
| 2001/0038890 A1 | 11/2001 | Buazza et al. |
| 2002/0033369 A1 | 3/2002 | Bender |
| 2002/0173728 A1 | 11/2002 | Mault |
| 2003/0175987 A1 | 9/2003 | Verdonk et al. |
| 2003/0188740 A1 | 10/2003 | Tribelsky et al. |
| 2006/0257094 A1 | 11/2006 | Mcevoy et al. |
| 2008/0085217 A1 | 4/2008 | Mueller |
| 2011/0111449 A1 | 5/2011 | Braig et al. |
| 2014/0224993 A1 | 8/2014 | Noh et al. |
| 2014/0306125 A1 | 10/2014 | Liebsch |
| 2015/0125347 A1 | 5/2015 | Machuca et al. |
| 2015/0185144 A1 | 7/2015 | Hirata et al. |
| 2016/0023183 A1 | 1/2016 | Levin |
| 2016/0131614 A1* | 5/2016 | Inoue .................. G01N 27/404 205/785.5 |
| 2016/0369222 A1 | 12/2016 | Cho |
| 2018/0164263 A1 | 6/2018 | Fischer et al. |
| 2019/0135480 A1 | 5/2019 | Crayne et al. |
| 2020/0368547 A1 | 11/2020 | Bourke, Jr. et al. |
| 2021/0330230 A1 | 10/2021 | Miller |
| 2022/0236170 A1 | 7/2022 | Kosterev |
| 2022/0390427 A1 | 12/2022 | Wu et al. |

FOREIGN PATENT DOCUMENTS

| | | | |
|---|---|---|---|
| DE | 10152994 | 8/2003 | |
| JP | 07159325 | 6/1995 | |
| JP | 2019174361 | 10/2019 | |
| WO | WO-2020055880 A1 * | 3/2020 | ............ G01N 21/64 |

OTHER PUBLICATIONS

"Enhanced Optics for Time-Resolved Singlet Oxygen Luminescence Detection" to Tsimvrakidis et al., IEEE J. of Select. Topics Quant. Elect. dated 2019.

Krasnovsky et al., "Kinetic Measurements of Singlet Oxygen Phosphorescence in Hydrogen-Free Solvents by Time-Resolved Photon Counting" ISSN 0006-2979, Biochemistry (Moscow), 2019, vol. 84, No. 2, pp. 153-163. Pleiades Publishing, Ltd.

Neidre et al., "Direct Near-infrared Luminescence Detection of Singlet Oxygen Generated by Photodynamic Therapy in Cells In Vitro and Tissues In Vivo" Photochemistry and Photobiology, 2002, 75(4): pp. 382-391.

Krasnovsky, "Singlet Molecular Oxygen in Photobiochemical Systems: IR Phosphorescence Studies" Membr. Cell Biol., 1998, vol. 12 (5), pp. 665-690. OPA (Overseas Publishers Association).

* cited by examiner

MEASUREMENT OF DISSOLVED OXYGEN USING OPTICAL RADIATION INDUCED LUMINESCENCE

BACKGROUND

Organic liquids can dissolve oxygen when they get into contact with air. Dissolved oxygen in an organic liquid can impact one or more downstream processes that utilize the organic liquid and/or can impact one or more properties of a final product being generated using the organic liquid. As one non-limiting example, chemical products such as plastics can be produced using an organic liquid precursor. The presence of dissolved oxygen in the organic liquid precursor (e.g., presence of at least a threshold concentration) can affect the polymerization process in producing the chemical product, can affect the color of the final chemical product, and/or can affect other properties of the final chemical product. Accordingly, monitoring of dissolved oxygen levels in organic liquids, that are utilized in chemical process(es), can be important to enable remediation(s) to be implemented when dissolved oxygen is present and/or is present with at least a threshold concentration.

Various techniques have been proposed for measuring dissolved oxygen in an organic liquid. However, those various techniques can require component(s) utilized in the measuring (e.g., probe(s) and/or semi-permeable membrane(s)) to directly contact the organic liquid, can require adding chemical(s) to the organic liquid, and/or can only be utilized with a limited subset of organic liquid(s). Contact of the component(s) with the organic liquid can result in contamination of the organic liquid and/or damage to the component(s) over time. Adding chemical(s) to the organic liquid can adversely impact its properties. In some situations, this can require wastefully removing samples of the organic liquid to enable analysis of the samples without adversely impacting the entirety of the organic liquid.

SUMMARY

Implementations described herein relate to methods and apparatus for inducing luminescence of dissolved oxygen in a liquid and analyzing detected luminescent light, from the luminescence, to determine measurement(s) related to the dissolved oxygen (if any) in the liquid. For example, analyzing the detected luminescent light to determine if the liquid includes dissolved oxygen (e.g., includes at least a threshold concentration), to determine a predicted concentration of the dissolved oxygen in the liquid, and/or to determine other measurement(s) related to dissolved oxygen in the liquid.

In some implementations, a method includes controlling an optical source to emit optical radiation into a container that contains a liquid. The optical source is located outside of the container and the optical radiation includes radiation at a wavelength that conforms to a dissolved oxygen absorption band. The method further includes generating optical measurements. The optical measurements are generated by a photodetector that is located outside of the container but that is in optical communication with the interior of the container. The method further includes analyzing the optical measurements to determine whether the liquid contains dissolved oxygen.

These and other implementations of the technology disclosed herein can include one or more of the following features.

In some implementations, the optical radiation includes a plurality of pulses. In some of the pulsed optical radiation implementations, the method further includes determining, based on one or more characteristics of the liquid, a desired duration of each of the pulses. In those implementations, controlling the optical source includes controlling the optical source to generate the sequence of pulses based on the desired duration. The one or more characteristics can include one or more of: a classification of the liquid, one or more chemicals included in the liquid, or a temperature of the liquid.

In some of the pulsed optical radiation implementations, the method further includes determining a subset of the optical measurements based on the subset being detected during non-pulse time periods. In those implementations, analyzing the optical measurements includes analyzing only the subset of the optical measurements. The non-pulse time periods are when the pulses of the optical radiation are not occurring.

In some of the pulsed optical radiation implementations, the method further includes generating the optical measurements based only on detections, by the photodetector, that occur during non-pulse time periods.

In some implementations, the optical radiation is periodically intensity modulated. In some of the periodically intensity modulated optical radiation implementations, analyzing the optical measurements includes analyzing a quadrature harmonic component (that is, phase-shifted by $\pi/2$ with respect to the excitation modulation), of the optical measurements, in determining whether the liquid contains dissolved oxygen. In some of those implementations, the method further includes determining the quadrature component using a lock-in amplifier and/or determining the optimal modulation frequency based on a luminescence lifetime, for dissolved oxygen, that is specific to the liquid.

In some of the periodically intensity modulated optical radiation implementations, the optical radiation is sine-wave intensity modulated.

In some of the periodically intensity modulated optical radiation implementations, the optical radiation is transmitted through a shortpass filter, a bandpass filter, and/or a polarizer prior to entering the container. For example, the optical radiation can be transmitted through just the bandpass filter. As another example, the optical radiation can be transmitted through just the shortpass filter and the polarizer.

In some of the periodically intensity modulated optical radiation implementations, any luminescent light that is emitted by luminescence of any dissolved oxygen, of the liquid, responsive to excitation by the optical radiation, and that encounters the photodetector, is transmitted through a longpass filter or bandpass filter after exiting the container and prior to encountering the photodetector.

In some implementations, the optical radiation, after emission by the optical source, travels through at least part of an optical surface of the container prior to entering the container.

In some implementations, analyzing the optical measurements includes determining a predicted concentration of the dissolved oxygen in the liquid.

In some implementations, dissolved oxygen measurement system is provided and includes a container to temporarily store liquid for analysis. The container includes an exterior surface with one or more optical windows that are transparent or semi-transparent. The system further includes an optical source to emit optical radiation. The optical source is located external to the container and positioned to emit the optical radiation through at least one of the one or more optical windows and into an interior of the container. The optical radiation includes radiation at a wavelength that conforms to an absorption band of dissolved oxygen. The system further includes a photodetector located external to the container. The photodetector is in optical communication with the interior of the container via one or more of the optical windows and, optionally, other optical elements such as lenses and/or filters.

These and other implementations of the technology disclosed herein can include one or more of the following features.

In some implementations, the system further includes one or more processors to process optical measurements by the photodetector and determine, based on the processing, a predicted concentration of any dissolved oxygen in the liquid.

In some implementations, the optical radiation includes a plurality of pulses or is periodically intensity modulated.

In some implementations, the system further includes a shortpass filter located external to the container and positioned in an optical path of the optical radiation, a bandpass filter located external to the container and positioned in an optical path of the optical radiation, and/or a polarizer located external to the container and positioned in the optical path of the optical radiation. For example, the system can include either the shortpass filter or the bandpass filter and can also include the polarizer. As another example, the system can include just the shortpass filter.

In some implementations, the system further includes a longpass filter located external to the container and positioned between the container and the photodetector, a bandpass filter located external to the container and positioned between the container and the photodetector, and/or a spatial filter located external to the container and positioned between the container and the photodetector. For example, the system can include just the longpass filter or just the bandpass filter.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
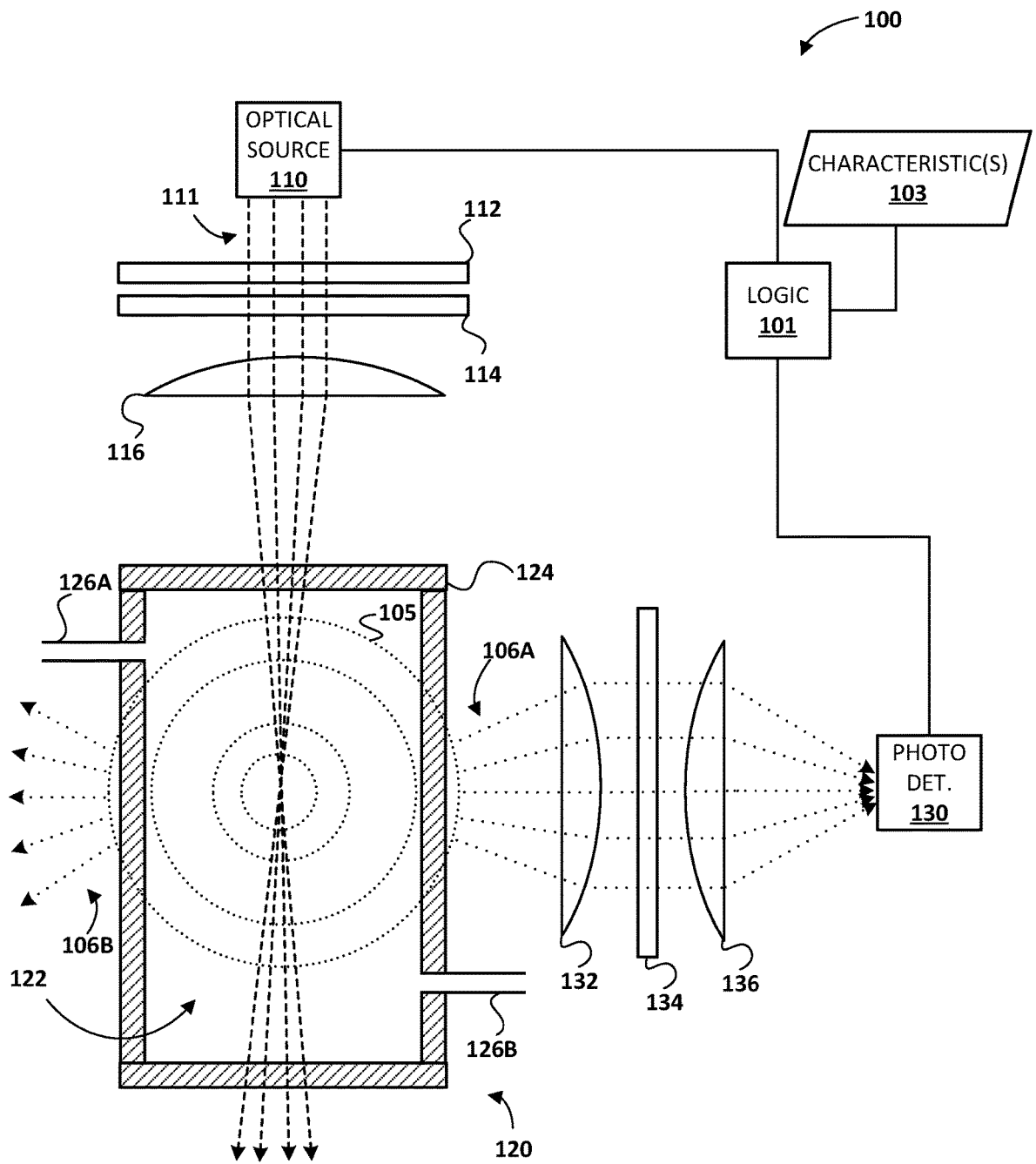
FIG. 1 schematically depicts an example dissolved oxygen measurement system in which selected aspects of the present disclosure may be employed in accordance with various implementations.

Implementations described herein relate to methods and apparatus for inducing luminescence of a target dissolved molecule in a liquid and analyzing detected luminescent light, from the luminescence, to determine measurement(s) related to the dissolved molecule (if any) in the liquid. For example, analyzing the detected luminescent light to determine if the liquid includes the target molecule (e.g., includes at least a threshold concentration), to determine a predicted concentration of the target molecule in the liquid, and/or to determine other measurement(s) related to the target molecule in the liquid. In various implementations, the dissolved molecule is dissolved oxygen, and many examples provided herein will be described with respect to dissolved oxygen. However, implementations of methods and apparatus described herein can be utilized for other target molecules in fluids or solids.

The luminescence of the target dissolved molecule can be induced using a laser and/or other optical source that emits optical radiation that includes (e.g., is restricted to) radiation at a wavelength that conforms to an absorption band of the dissolved molecule. For example, absorption bands of dissolved oxygen include 755-775 nanometers and 1263-1283 nanometers. Radiation that conforms to an absorption band of the dissolved oxygen can include radiation that is within the absorption band or is within 2 nanometers, within 5 nanometers, or within other threshold of the absorption band center.

The detection of the luminescent light from the luminescence can be performed using a photodetector, such as a photodiode or a photomultiplier tube (PMT). For example, the photodetector can be in an optical path of luminescent light, if any, that is generated by luminescence of the target molecule responsive to the optical radiation. Further, the photodetector can generate optical measurements and those optical measurements will be influenced by the luminescent light when it is being generated.

In many implementations, the optical source that emits the optical radiation and the photodetector that detects luminescent light (if any) induced by the optical radiation, can both be completely free of contact with the liquid that is being analyzed. In some versions of those implementations, the optical source and the photodetector are external to a container that temporarily stores the liquid for analysis (e.g., includes an inlet and outlet for the liquid to pass through). In those versions, the container can include one or more optical windows and one or more of the window(s) can enable optical radiation to pass into the container and one or more of the window(s) (the same and/or different window(s)) can enable luminescent light to pass out of the container. For example, at least a portion of a shell of the container can be constructed from an optical material (e.g., acrylic, glass, polycarbonate) and that portion can form an optical window (e.g., the sole optical window or one of multiple optical windows).

In some versions where the container includes optical window(s), the optical source is positioned so that emitted optical radiation is directed towards optical window(s) of the container, and enters the container by travelling through the optical window(s). Lens(es) and/or reflector(s) can optionally be interposed between the optical source and the optical window(s) through which the optical radiation travels, and can direct and/or focus the optical radiation towards the optical window(s). Further, optical filter(s) (e.g., shortpass, longpass, bandpass, and/or spatial) and/or optical polarizer(s) can additionally or alternatively be interposed between the optical source and the optical window(s).

Yet further, in some versions where the container includes optical window(s), the photodetector is positioned so that luminescent light, that is emitted by luminescence of the target dissolved molecule and that exits the container by travelling through optical window(s), is directed toward the photodetector. Optical lens(es) and/or optical reflector(s) can optionally be interposed between the optical source and the optical window(s) through which the luminescent light exits the container, and can direct and/or focus the luminescent light towards the photodetector. Optical filter(s) and/or polarizer(s) can additionally or alternatively be interposed between the photodetector and the optical window(s).

In some implementations disclosed herein, the optical source is controlled so that the optical radiation has a non-continuous excitation. In some versions of those implementations, the optical radiation is pulsed. In some other versions of those implementation, the optical radiation is periodically intensity modulated (e.g., sine-wave intensity modulated).

In some implementations where the optical radiation is pulsed, a duration of each of the pulses can be determined based on the lifetime of the excited target dissolved molecule, which can vary amongst different liquids. For example, for dissolved oxygen the duration of each of the pulses can be determined based on the singlet $O_2$ lifetime in the liquid being analyzed, which varies amongst different liquids. For instance, the singlet $O_2$ lifetime can be approximately 17 milliseconds in tetrachloromethane, while being 0.051 milliseconds in acetone. In some versions of those implementations, the duration can be determined based on multiplying the lifetime by a factor such as three, or a value from two to four. For example, by having the duration of each of the pulses be three times the singlet $O_2$ lifetime for the liquid analyte, approximately 95% of the maximum possible number of excited $O_2$ molecules in the liquid will be reached by the end of the pulse.

Utilizing a duration for the pulses that is based on the liquid being analyzed and that seeks to achieve a threshold percentage (e.g., 95%, 90%, or other threshold) of excited molecules can ensure that the pulses are of a long enough duration, but not of a longer than necessary duration. The long enough duration ensures that the threshold percentage of target dissolved molecules are excited so that resulting luminescent light can be detected and/or can be used to resolve a dissolved concentration and/or other dissolved measurement(s). Preventing the duration from being longer than necessary to achieve the threshold percentage, enables a greater quantity of luminescent light, occurring in non-pulse time periods, to be analyzed over a period of time. This enables faster resolution of target dissolved molecule measurement(s), which can be based on analysis of multiple instances of detected luminescent light that occur in non-pulse time periods.

In some implementations, one or more characteristics of the liquid analyte can be received (e.g., based on human operator input or input from a control system), and the characteristic(s) utilized to determine the duration of each of the pulses. Those characteristic(s) can include a classification of the liquid and/or a temperature of the liquid. The classification of the liquid can be a genus classification that encompasses multiple liquids (e.g., "hydrogen-containing") or a more granular classification that encompasses only a particular solvent (e.g., "acetone"). As one particular example, memory or other computer readable medium can store associations that are each between one or more particular characteristic(s) and a corresponding pulse duration. The received characteristic(s) can be used to determine, from the memory, the corresponding pulse duration. The optical source can then be controlled based on the corresponding pulse duration. For instance, a driver for the optical source can be configured based on the corresponding pulse duration.

In some implementations where the optical radiation is pulsed, time-resolved measurement and/or analysis is utilized. Put another way, the luminescent light that is analyzed (e.g., in determining a predicted concentration of the target dissolved molecule), can be restricted to luminescent light that is detected by the photodetector during non-pulse time periods that each follow a corresponding pulse. The luminescence of dissolved oxygen and other dissolved molecules has a non-zero lifetime, meaning it will continue after a corresponding pulse and can therefore be detected during non-pulse time periods. For example, the lifetime of luminesced dissolved oxygen in acetone can be approximately 0.051 milliseconds and the lifetime of luminesced dissolved oxygen in tetrachloromethane can be approximately 17 milliseconds. Further, Rayleigh scattering of the optical radiation is instantaneous, meaning it occurs only during the pulses. Accordingly, analyzing luminescent light detected during non-pulse time periods that follow pulses can prevent (or at least mitigate) light from Rayleigh scattering from adversely impacting the dissolved target molecule analysis, as Rayleigh scattering will not occur during the non-pulse time periods and light from Rayleigh scattering will therefore not impact the luminescent light detected during non-pulse time periods. In some other implementations, luminescent light from pulse time periods can optionally also be considered during analysis, but the analysis can at least be weighted more heavily toward luminescent light that is detected during non-pulse time periods.

In some implementations where analysis is restricted to, or weighted more heavily toward, luminescent light that is detected by the photodetector during non-pulse time periods, the photodetector can only be activated and detecting luminescent light during such non-pulse time periods. In some other implementations, the photodetector can also be activated during pulse time periods, but a subset of the luminescent light determined based on it occurring during non-pulse time periods, and only that subset is analyzed (or that subset is weighted more heavily in the analysis). In determining non-pulse time periods, a signal from the optical source can be utilized that indicates when the optical source is producing optical radiation and/or is not producing optical radiations. Additionally or alternatively, a common or synchronized clock can be utilized to differentiate pulse and non-pulse time periods. In some implementations, the duration of each of the non-pulse time periods can be determined based on characteristic(s) of the liquid being analyzed. For example, if dissolved oxygen is being analyzed and the characteristic(s) include a granular classification that indicates a particular liquid, the duration can be based on the lifetime of luminesced singlet $O_2$ in the liquid. For instance, the lifetime in acetone can be approximately 0.051 milliseconds and the non-pulse time periods can each be equal to, or within a threshold of (e.g., within 10% of, within 5% of, or within other threshold percentage of).

In some implementations, where the optical radiation is periodically intensity modulated (e.g., sine-wave modulated), the fixed modulation frequency can optionally be determined based on characteristic(s) of the liquid being analyzed. For example, if the characteristic(s) include a granular classification that indicates a particular liquid, the duration can be based on the lifetime of luminesced dissolved molecule in the liquid. For instance, for dissolved oxygen a first frequency can be utilized for acetone (where the lifetime is approximately 0.051 ms), whereas a lower second frequency can be utilized for tetrachloromethane (where the lifetime is approximately 17 ms). It is noted that when the optical radiation is periodically intensity modulated, the luminescence of the dissolved target molecule will also be periodically intensity modulated. However, the amplitude of the modulated luminescence can vary from that of the optical radiation and can be phase shifted relative to that of the optical radiation. The variance in amplitude and/or phase can be dependent on the lifetime of the luminesced target molecule in the liquid analyte and the amplitude and frequency of the optical radiation.

Also, in some implementations where the optical radiation is periodically intensity modulated, optical measurements that are generated by the photodetector can be influenced by light from Rayleigh scattering. In some of those implementations, analyzing the optical measurements can include analyzing a quadrature (phase-shifted 90 degrees) component, of the optical measurements, in determining measure(s) of the target dissolved molecule. Analyzing the quadrature component, while not analyzing the in-phase component, can effectively suppress (or even fully eliminate), from the analysis, the light that is a result of Rayleigh scattering. Optionally, a lock-in amplifier is utilized, in processing the optical measurements, to enable the measurements of the quadrature component of detected light. The reference signal for the lock-in amplifier can be based on the periodically intensity modulated optical radiation or the electrical signal inducing that modulation, optionally taking into account the phase shift of the modulated luminescence which, as described above, can be dependent on the radiative lifetime of the target dissolved molecule in the liquid analyte and optionally dependent on properties of the optical radiation.

Also, in some implementations where the optical radiation is periodically intensity modulated, one or more optical components and/or optical techniques can additionally or alternatively be utilized to suppress detected light that is the result of Rayleigh scattering. As one example, optical polarizer(s) can be in the path of the optical radiation (e.g., interposed between the optical source and optical window(s) of the container), and selected to mitigate Rayleigh scattering. As another example, spectral filter(s) selected to filter out certain wavelength(s) can additionally or alternatively be utilized. For instance, a shortpass filter can be in the path of the optical radiation and/or a longpass filter can be interposed between optical window(s) and the photodetector. This can be effective as luminescence is red-shifted relative to the optical radiation, whereas background light from Rayleigh scattering conforms to the spectrum of the optical radiation. As yet another example, spatial filter(s) can additionally or alternatively be utilized, such as a spatial filter interposed between optical window(s) and the photodetector.

Turning now to the figures, FIG. 1 schematically depicts an example dissolved oxygen measurement system 100 in which selected aspects of the present disclosure may be employed in accordance with various implementations. The components depicted in FIG. 1 are not drawn to scale. Various component sizes and spatial relationships between various components are exaggerated for illustrative purposes.

Dissolved oxygen measurement system 100 includes a container 120 that includes an interior 122 that at least temporarily contains liquid for dissolved oxygen analysis. The container 120 includes a shell 124 that is illustrated with hatch lines in FIG. 1 and that defines the interior 122. The shell 124 can take various forms depending on a shape of the container 120. For example, in FIG. 1, container 120 can have a cylindrical shape (shown in cross section of FIG. 1). In other implementations in which optical container 120 has other shapes, the shape of the container 120 can differ.

In FIG. 1, the entirety of the shell 124 is constructed from an optical material, such as acrylic or glass, and is transparent or translucent. Accordingly, in FIG. 1 the shell 124 effectively forms a singular optical window via which optical radiation can enter into the interior 122 and/or via which luminescent light can exit. In some other implementations, portion(s) of the shell 124 can be opaque, while other portion(s) of the shell 124 can be transparent or translucent. Accordingly, in those implementations, less than the entirety of the shell 124 allows light to enter and/or exit, and the shell 124 can include multiple optical window(s) via which light can enter and/or exit.

The liquid(s) that can be contained by container 120 include various organic liquids, such as those utilized in various chemical processes. In various implementations, optical container 120 can be hermetically sealed, e.g., by the shell 124, so that liquid contained in the interior 122 cannot escape except at selected locations. For example, container 120 can optionally include one or more passages 126A, 126B through shell 124 that are selected locations provided for introducing a liquid sample into interior 122 of the container 120 for analysis, and for removing the liquid sample from the interior 122. In FIG. 1, first passage 126A is for introducing liquid into the interior 122 and second passage 126B is for removing liquid from the interior 122, but this is not meant to be limiting. For example, passages 126A, 126B may take various forms, such as valves that are operable to permit and/or prevent passage of liquid in/out of the interior 122. As another example, a single passage can be provided for both introducing liquid into the interior and for expelling liquid from the interior.

Dissolved oxygen measurement system 100 also include an optical source 110 and a photodetector, which are both external to the container 120 and, as a result, are free of contact with any liquid that is introduced into the container 120.

The optical source 110 emits optical radiation 111. The optical radiation 111 emitted by optical source 110 can include (e.g., is restricted to) radiation at a wavelength that conforms to an absorption band of dissolved oxygen. The optical source 110 can take various forms, such as laser source or an optical fiber that delivers laser light that is emitted from an external laser source. The optical source 110 can emit coherent or incoherent light. As described herein, in various implementations, the optical source 110 is controlled (e.g., by logic 101 described below) so that the optical radiation 111 has a non-continuous excitation, such as a pulsed excitation or, alternatively, a periodically intensity modulated excitation.

In FIG. 1, various optical elements are illustrated external to the container 120 and positioned in an optical path of the optical radiation 111. More particularly, FIG. 1 is illustrated with a shortpass filter 112, a polarizer 114, and a positive lens 116. In various implementations, one or more of the illustrated optical components in the optical path can be omitted. Further, additional and/or alternative optical component(s) can be provided, such as mirror(s) or other reflector(s) that redirect the optical radiation 111 along an alternate optical path.

In implementations where shortpass filter 112 is provided, it can be selected to filter out wavelengths of radiation that are longer than a value such as a value that is near (e.g., within 5 nanometers, 10 nanometers or other threshold of) the radiation, included in the optical radiation 111, that is at a wavelength that conforms to an absorption band of dissolved oxygen. For example, where such radiation is from 1263-1283 nanometers, the shortpass filter 112 can filter out wavelengths that are longer than 1283 nanometers. In implementations where polarizer 114 is provided, it can be utilized to mitigate Rayleigh scattering into an optical path of the photodetector 130. In various implementations, shortpass filter 112 and/or polarizer 114 are provided when the optical radiation 111 is periodically intensity modulated radiation. In implementations where positive lens 116 is provided, it can narrow the optical radiation 111 to focus it toward the interior 122 of the container 120, via passage through a portion of the shell 124.

Since the optical radiation 111 emitted by optical source 110 includes radiation at a wavelength that conforms to an absorption band of dissolved oxygen, any dissolved oxygen that is present in a liquid contained within the container 120 is luminesced through excitation by the optical radiation 111. The liquid contained within the container 120 is not illustrated in FIG. 1 for the sake of simplicity. However, luminescence 105 is schematically illustrated as dotted concentric circles. Luminescence 105 represents the luminescence of dissolved oxygen responsive to excitation by the radiation, of the optical radiation 111, that is at a wavelength that conforms to an absorption band of dissolved oxygen. Also illustrated in FIG. 1 is some of the luminescent light 106A that is emitted from the interior 122, through the shell 124, and into an optical path of the photodetector 130.

In FIG. 1, various optical elements are illustrated external to the container 120 and positioned in the optical path of the photodetector 130. More particularly, FIG. 1 is illustrated with a collimator 132, a longpass filter 134, and a positive lens 136. In various implementations, one or more of the illustrated optical components in the optical path can be omitted. Further, additional and/or alternative optical component(s) can be provided, such as mirror(s) or other reflector(s) that redirect the luminescent light 106A along an alternate optical path of the photodetector 130.

In implementations where longpass filter 136 is provided, it can be selected to filter out wavelengths of radiation that are shorter than the wavelength of radiation included in the optical radiation 111. For example, where the optical radiation 111 wavelength is 1269 nm, the longpass filter 136 can filter out wavelengths that are shorter than 1270 nanometers. This can be beneficial for filtering out light that is the result of Rayleigh scattering, while allowing luminescent light to pass since the luminescent light can be red-shifted relative to the radiation, included in the optical radiation 111, that is at a wavelength that conforms to an absorption band of dissolved oxygen (whereas the light that is the result of Rayleigh scattering is not). In various implementations, longpass filter 134 is provided when the optical radiation 111 is periodically intensity modulated radiation. In implementations where positive lens 136 is provided, it can narrow the luminescent light 106A (and any other light emitted from the container 120, such as light that is the result of Rayleigh scattering), to focus it toward the photodetector 130. In implementations where collimator 132 is provided, it can collimate the luminescent light 106A (and any other light emitted from the container 120, such as light that is the result of Rayleigh scattering).

Also illustrated in FIG. 1 is other luminescent light 106B that may be emitted from the container 120, but not directed to the photodetector (i.e., not in the optical path of the photodetector). It is noted that additional luminescent light can be emitted, but only luminescent light 106A and 106B are illustrated for simplicity. In some implementations, reflector(s) can optionally be provided for redirecting luminescent light 106B and/or other luminescent light along an optical path of the photodetector 130.

The photodetector 130 can be, for example, a photodiode or a PMT. The photodetector 130 is positioned so that at least some of the luminescent light (e.g., luminescent light 106A), that is emitted by luminescence of dissolved oxygen and that exits the container 120 by travelling through optical window(s) of the shell 124, is directed toward the photodetector 130. The photodetector 130 generates optical measurements that are each based on light detected by the photodetector 130 at a corresponding moment in time. Some of those optical measurements can be influenced by luminescent light, such as luminescent light 106A and, optionally, some of those optical measurements can be influenced by other light, such as light from Rayleigh scattering.

Logic 101 may be provided and operably coupled with optical source 110 and/or with photodetector 130. Logic 101 may take various forms, such as one or more processors that execute instructions (transitory and/or non-transitory) stored in a memory (not depicted) to perform all or aspects of one or more methods described herein. For example, one or more of the processor(s) can analyze optical measurements to determine, based on the optical measurements, one or more measurements related to dissolved oxygen. As another example, one or more of the processor(s) can additionally or alternatively receive characteristic(s) 103, of a liquid to be analyzed, and determine based on the characteristic(s) 103 (e.g., based on data, in memory, that is mapped to the characteristic(s)), how to control the optical source 110 (e.g., determine a pulse duration), time period(s) when the photodetector 130 should be detecting optical measurements, and/or how to analyze optical measurements to determine measure(s) related to dissolved oxygen. The characteristic(s) 103 can be, for example, based on user input(s), such as input(s) that specify the characteristic(s). The characteristic(s) 103 can additionally or alternatively be based on, for example, input(s) from a control system, such as a control system of a chemical processing plant.

The processor(s) that can be included in logic 101 can include, for example, microprocessor(s), application-specific integrated circuit(s) (ASIC(s)) and/or a field-programmable gate array(s) (FPGA(s)). The logic 101 can additionally or alternatively include one or more discrete component(s) that can be analog or digital and can each optionally incorporate one or more of the processor(s). For example, the logic 101 can include a lock-in amplifier that can be used to process optical measurements from the photodetector 130 to extract, from the optical measurements, the quadrature component of detected light. As another example, the logic 101 can include a driver for the optical source 110, and the driver can optionally be configured (e.g., dynamically) to generate pulsed or modulated optical radiation with desired characteristic(s). For example, the driver can be configured to generated pulsed optical radiation with pulses having a desired pulse duration determined as described herein.

It is noted that the liquid that will be within the container can have properties such as temperature, particulate, acidity, etc. that would corrode or otherwise damage optical source 110, photodetector 130, and/or optical component(s) 112, 114, 116, 132, 134, and/or 136. The arrangement of the optical source 110, photodetector 130, and/or optical component(s) 112, 114, 116, 132, 134, and/or 136, enables such component(s) to be external to the container and not in contact with the liquid, while still enabling effective dissolved oxygen analysis.

Figure 2:
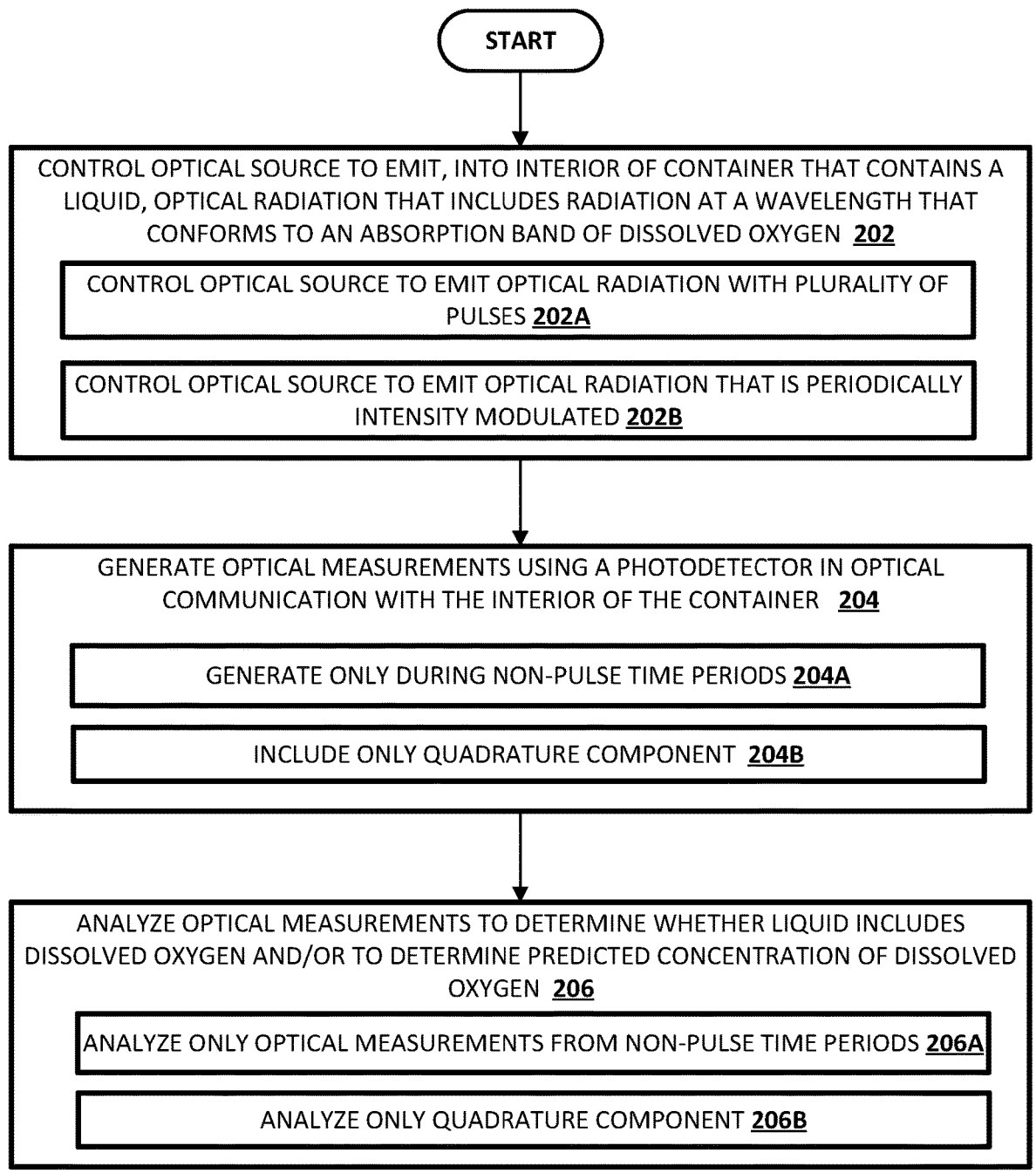
FIG. 2 is a flowchart of an example method in accordance with various implementations described herein.

FIG. 2 illustrates a flowchart of an example method 200 for practicing selected aspects of the present disclosure. Other implementations may include additional operations than those illustrated in FIG. 2, may perform step(s) of FIG. 2 in a different order and/or in parallel, and/or may omit one or more of the operations of FIG. 2. The step(s) of FIG. 2 are described with respect to a system that implements the step(s). Such a system can include, for example, one or more of the component(s) of FIG. 1.

At step 202, the system controls an optical source to emit, into the interior of a container that contains a liquid, optical radiation that includes radiation at a wavelength that conforms to an absorption band of dissolved oxygen. For example, the optical source can be controlled to emit optical radiation along an optical path, through optical window(s) of a shell of the container, and into the container.

Step 202 can, in some implementations, include either step 202A or step 202B.

At step 202A, the system controls the optical source to emit optical radiation with a plurality of pulses. In some implementations, a duration of each of the pulses is based on the singlet $O_2$ lifetime in the liquid being analyzed, which varies amongst different liquids. In some versions of those implementations, the system determines the pulse duration based on input(s) that indicate characteristic(s) of the liquid. In some additional or alternative versions, the duration can be determined based on multiplying the singlet $O_2$ lifetime in a liquid to be analyzed by a factor such as three, or a value from two to four. For example, by having the duration of each of the pulses be three times the singlet $O_2$ lifetime for the liquid analyte, approximately 95% of the maximum possible (at the given radiation power) number of $O_2$ molecules in the liquid will be excited by the end of the pulse. More particularly, in the case of constant intensity of the optical radiation, the number of excited molecules N can be described by a kinetic equation:

$$\frac{dN}{dt} = A - \frac{N}{\tau},$$

where A is the rate of excitation and $\tau$ is the singlet $O_2$ lifetime in the analyte. Assuming no excited molecules initially, the solution of that differential equation is $$N(t) = A\tau\left(1 - e^{-\frac{t}{\tau}}\right).$$

From that solution, it can be determined that 95% of the maximum possible number of excited molecules is reached when the pulse duration is three times the singlet $O_2$ lifetime ($\tau$). Other factor(s) (besides three times) can be selected to achieve another desired percentage of excited molecules.

At step 202B, the system controls the optical source to emit optical radiation that is periodically intensity modulated (e.g., sine-wave modulated). In some implementations, the fixed modulation frequency can optionally be determined based on characteristic(s) of the liquid being analyzed. For instance, a first frequency can be utilized for acetone (where the lifetime is approximately 0.051 ms), whereas a lower second frequency can be utilized for tetrachloromethane (where the lifetime is approximately 17 ms).

At step 204, the system generates optical measurements, using a photodetector that is in optical communication with the interior of the container. For example, the photodetector can be external to the container, but positioned so that at least some of any luminescent light, generated by dissolved oxygen luminescence in response to excitation by the optical radiation of step 202, that exits the container by travelling through optical window(s) thereof, is directed toward the photodetector. The optical measurements are each based on light detected by the photodetector at a corresponding moment in time. Some of those optical measurements can be influenced by luminescent light if it is being generated at corresponding times. Optionally, some of those optical measurements can be influenced by other light, such as light from Rayleigh scattering, if it is being generated at corresponding times.

Step 204 can, in some implementations, include either step 204A or step 204B.

Step 204A can optionally be performed in some implementations when step 202A is performed. At step 204A, the system generates optical measurements only during non-pulse time periods. That is, the system generates optical measurements only during at least part of the duration when pulses are not being generated by the optical source. This can mitigate (or prevent) any detection of scattered light, while enabling detection of luminescent light from luminescence that continues after a corresponding pulse ends.

Step 204B can optionally be performed in some implementations when step 202B is performed. At step 204B, the system generates optical measurements that include only the quadrature component of detected light. In some implementations, a lock-in amplifier is utilized in processing light that is initially detected by the photodetector, to generate optical measurements that include only the quadrature component of the detected light. As described herein, this can help suppress, from the optical measurements, light that is a result of Rayleigh scattering.

At step 206, the system analyzes the optical measurements, of step 204, to determine whether the liquid includes dissolved oxygen and/or to determine a predicted concentration of the dissolved oxygen. These determination(s) can be based on, for example, time-resolved magnitude(s) and/or amplitude(s) of one or more of the optical measurement(s). In some implementations, in determining measurement(s) related to dissolved oxygen in an analyte, the system determines the measurement(s) based on the optical measurements and based on a radiative lifetime of the dissolved oxygen for the analyte. For example, stronger luminescence is expected for shorter radiative lifetimes, whereas weaker luminescence is expected for longer radiative lifetimes.

Step 206 can, in some implementations, include either step 206A or step 206B.

Step 206A can optionally be performed in some implementations when step 202A is performed. At step 206A, the system analyzes only optical measurements that are from non-pulse time periods, without analysis of measurements (if any) from pulse time periods. In some implementations (e.g., when step 204A is performed), the optical measurements generated by the photodetector are restricted to those from non-pulse time periods. In other implementations, the optical measurements include those from pulse time periods and non-pulse time periods. In those other implementations, the subset of optical measurements from the non-pulse time periods can be determined and analyzed. For example, timestamps from the measurements and a signal from the optical source (e.g., a driver thereof) can be utilized to identify the subset of optical measurements from non-pulse time periods.

Step 206B can optionally be performed in some implementations when step 202B is performed. At step 206B, the system analyzes only the quadrature component of optical measurements. In some implementations (e.g., when step 204B is performed), the optical measurements generated by the photodetector are restricted to quadrature component measurements. In other implementations, the optical measurements include quadrature component and in-phase component. In those other implementations, the quadrature component can be determined and analyzed. For example, a phase-shift between the optical radiation and the optical measurements can be utilized to resolve the quadrature component.

Figure 3:
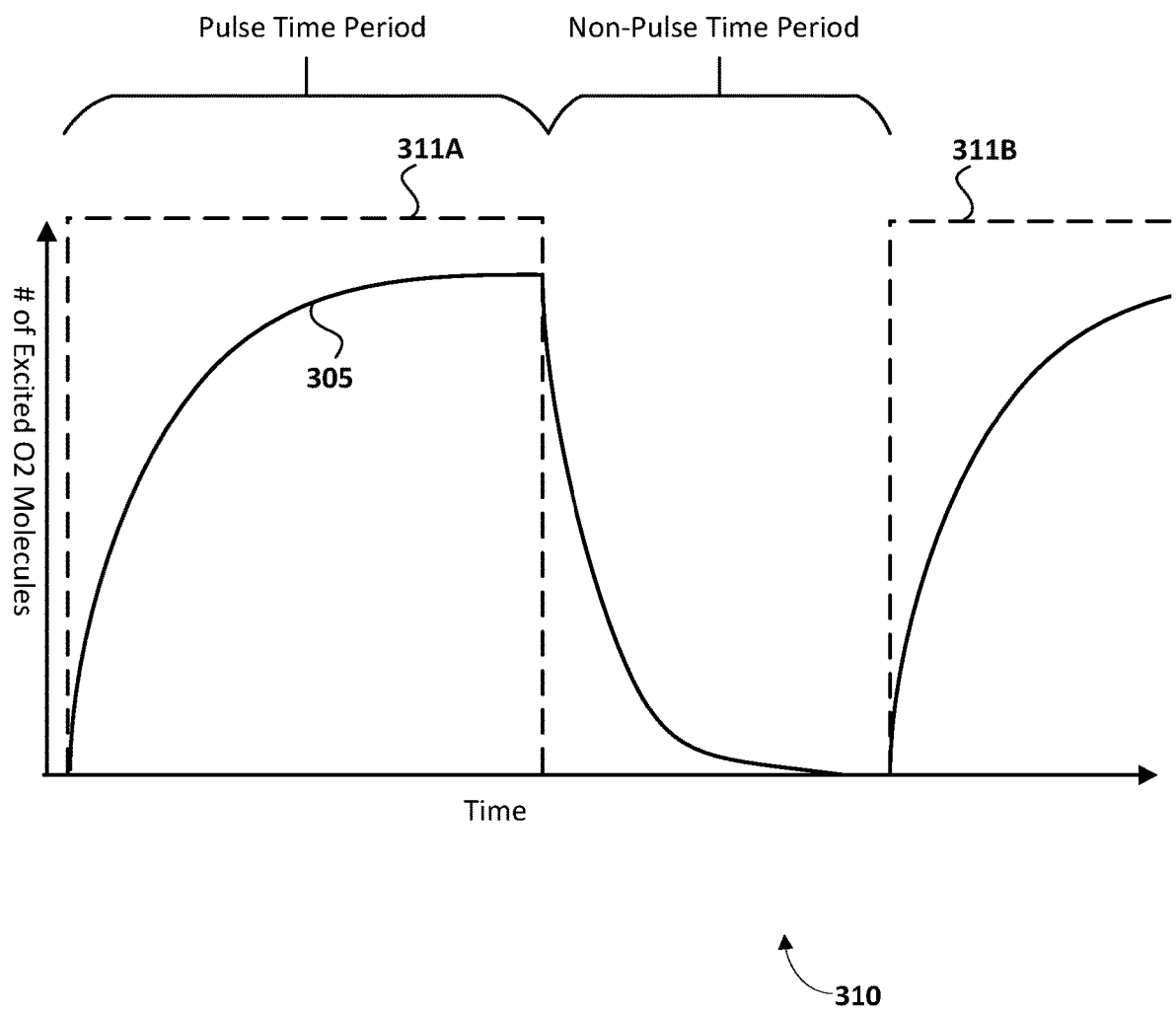
FIG. 3 illustrates an example of a quantity of excited oxygen molecules, over time, along with an example of pulsed optical radiation.

FIG. 3 illustrates an example of a quantity of excited oxygen molecules, over time, along with an example of pulsed optical radiation. In particular, the line 305 represents the quantity of excited oxygen molecules, the dotted lines 311A represent a first pulse of pulsed optical radiation, and the dotted lines 311B represent a portion of a second pulse of pulsed optical radiation. A pulse time period, corresponding to the first pulse, is also annotated, as is a non-pulse time period that is in the time between the first pulse and the second pulse.

As can be seen from FIG. 3, the quantity of excited oxygen molecules increases throughout the first pulse. Upon cessation of the first pulse, the quantity of excited oxygen molecules decays. However, notably, excited oxygen molecules (and their resulting luminescence) remain after cessation and for at least part of the non-pulse time period. Moreover, Rayleigh scattering ceases upon cessation of the first pulse. Accordingly, analyzing optical measurements that occur during the non-pulse time period mitigates or eliminates, from the analysis, influence of light from Ralyeigh scattering. This enables accurate and/or precise determination of whether dissolved oxygen is present and/or of a concentration of the dissolved oxygen. For example, the concentration can be determined based on time-resolved measurements of the optical radiation during all or portion(s) of non-pulse time periods.

Figure 4:
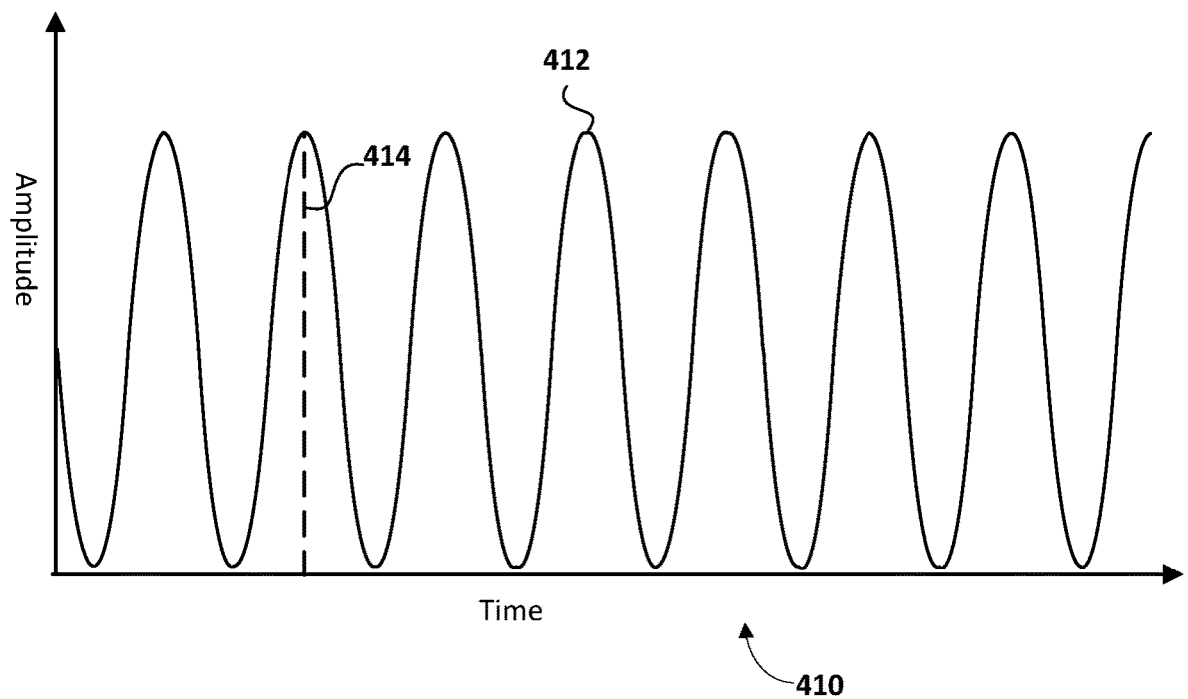
FIG. 4 illustrates an example of periodically intensity modulated optical radiation, and an example of detected optical measurements from the modulated optical radiation.
Figure 4:
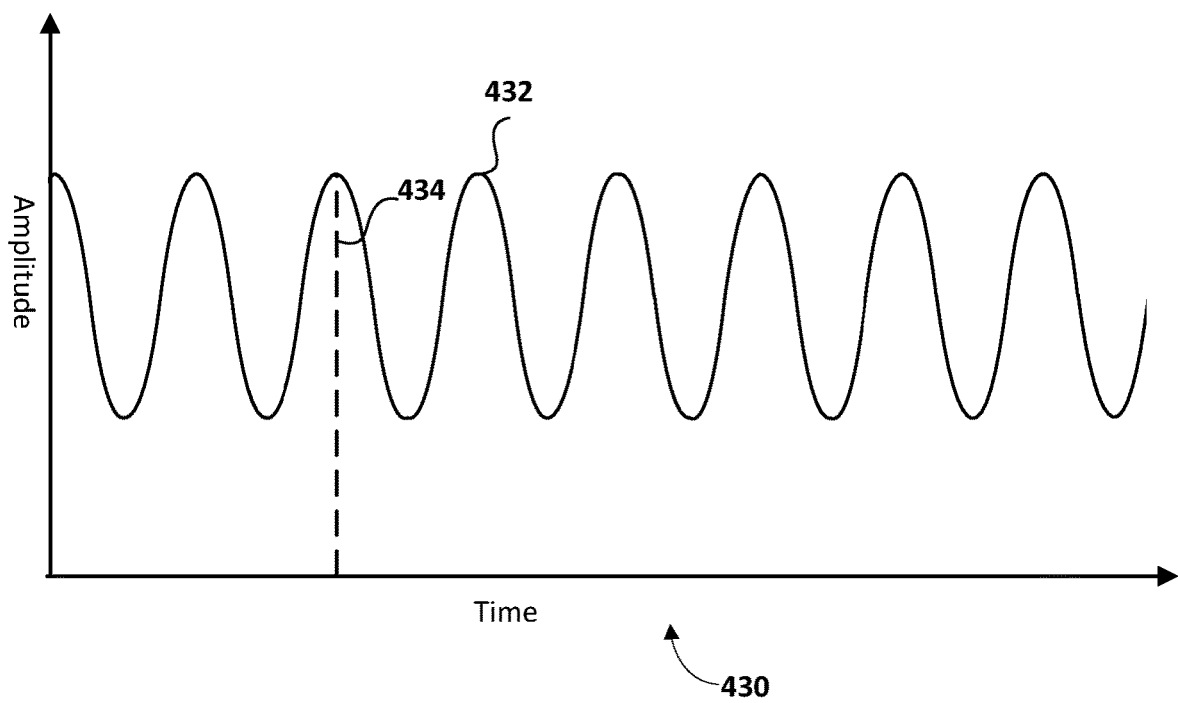

FIG. 4 illustrates an example of periodically intensity modulated optical radiation 410, and an example of detected optical measurements 430 from the modulated optical radiation. In particular, the line 412 represents the amplitude of the optical radiation 410 over time, and the line 432 represents the amplitude of the optical measurements 430 over time. It is noted that, in the example of FIG. 4, the frequency of the optical radiation 410 and the frequency of the optical measurements 430 is the same. However, the amplitude of the optical measurements 430 is reduced relative to those of the optical radiation 410. Further, the optical measurements 430 are phase-shifted ninety degrees relative to the optical radiation 410. This can be observed, for example, by viewing vertical lines 414 and 434, which reflect corresponding beginning of periods for the optical measurements 430 and optical radiation 410.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
   receiving optical measurements that are generated by a photodetector that is located outside of a container but that is in optical communication with liquid in an interior of the container, the optical measurements including at least one optical measurement that is based on detection of luminescent light that is emitted by dissolved oxygen in the liquid and that is emitted from luminescence of the dissolved oxygen in the liquid, the luminescence being induced by optical radiation that is emitted into the container and that comprises radiation at a wavelength that conforms to a dissolved oxygen absorption band, the wavelength being in the infrared spectrum; and
   analyzing the optical measurements to determine whether the liquid contains dissolved oxygen.

2. The method of claim 1, wherein the optical radiation comprises a plurality of pulses.

3. The method of claim 2, further comprising:
   determining a subset of the optical measurements based on the subset being detected during non-pulse time periods, the non-pulse time periods being when the pulses of the optical radiation are not occurring;
   wherein the analyzing the optical measurements comprises analyzing only the subset of the optical measurements.

4. The method of claim 1, wherein the optical radiation is periodically intensity modulated.

5. The method of claim 4, wherein the analyzing the optical measurements comprises:
   analyzing a quadrature component, of the optical measurements, in determining whether the liquid contains dissolved oxygen.

6. The method of claim 5, further comprising:
   determining the quadrature component using a lock-in amplifier.

7. The method of claim 5, further comprising:
   determining the quadrature component based on a radiative lifetime, for dissolved oxygen, that is specific to the liquid.

8. The method of claim 5, wherein the optical radiation is sine-wave periodically intensity modulated.

9. The method of claim 1, wherein the analyzing the optical measurements includes determining a predicted concentration of the dissolved oxygen in the liquid.

10. The method of claim 1, wherein the optical radiation consists of the radiation at the wavelength that conforms to the dissolved oxygen absorption band.

11. The method of claim 10, wherein the dissolved oxygen absorption band is from 1263 to 1283 nanometers.

12. The method of claim 10, further comprising controlling the optical source to emit the optical radiation.

13. A dissolved oxygen measurement system comprising:
a container including an interior to temporarily store liquid for analysis and including an exterior surface, the exterior surface including:
   a first optical window in optical communication with the interior, and
   a second optical window in optical communication with the interior,
      wherein the first optical window is distinct from the second optical window, and
      wherein the first optical window and the second optical window are both transparent or semi-transparent;
an optical source to emit optical radiation, the optical source located external to the container and positioned to emit the optical radiation through the first optical window and into the interior of the container, and the optical radiation comprising radiation at a wavelength that conforms to an absorption band of, and causes luminescence of, dissolved oxygen, wherein the wavelength is in the infrared spectrum; and
a photodetector located external to the container, the photodetector being in optical communication, via the second optical window, with the liquid in the interior of the container.

14. The dissolved oxygen measurement system of claim 13, further comprising:
one or more processors to process optical measurements by the photodetector and to determine, based on the processing, a predicted concentration of any dissolved oxygen in the liquid.

15. The dissolved oxygen measurement system of claim 14, wherein the optical radiation comprises a plurality of pulses or is periodically intensity modulated.

16. The dissolved oxygen measurement system of claim 15, further comprising one or more of:
   a shortpass filter located external to the container and positioned between the optical source and the first optical window in an optical path of the optical radiation,
   a bandpass filter located external to the container and positioned between the optical source and the first optical window in the optical path of the optical radiation, or
   a polarizer located external to the container and positioned between the optical source and the first optical window in the optical path of the optical radiation.

17. The dissolved oxygen measurement system of claim 16, further comprising one or more of:
   a longpass filter located external to the container and positioned between the second window and the photodetector,
   a bandpass filter located external to the container and positioned between the second window and the photodetector, or
   a spatial filter located external to the container and positioned between the second window and the photodetector.

18. The dissolved oxygen measurement system of claim 13, wherein the optical radiation comprises a plurality of pulses or is periodically intensity modulated.

19. The dissolved oxygen measurement system of claim 13, further comprising one or more of:
   a shortpass filter located external to the container and positioned between the optical source and the first optical window in an optical path of the optical radiation,
   a bandpass filter located external to the container and positioned between the optical source and the first optical window in the optical path of the optical radiation, or
   a polarizer located external to the container and positioned between the optical source and the first optical window in the optical path of the optical radiation.

20. The dissolved oxygen measurement system of claim 13, further comprising one or more of:
   a longpass filter located external to the container and positioned between the second window and the photodetector,
   a bandpass filter located external to the container and positioned between the second window and the photodetector, or
   a spatial filter located external to the container and positioned between the second window and the photodetector.

* * * * *